US009432663B2

(12) United States Patent
Lim et al.

(10) Patent No.: US 9,432,663 B2
(45) Date of Patent: Aug. 30, 2016

(54) METHOD AND APPARATUS FOR CODING/DECODING IMAGE

(71) Applicant: SK TELECOM CO., LTD., Seoul (KR)

(72) Inventors: Jeongyeon Lim, Seongnam-si (KR); Yunglyul Lee, Seoul (KR); Joohee Moon, Seoul (KR); Haekwang Kim, Seoul (KR); Byeungwoo Jeon, Seongnam-si (KR); Jongki Han, Seoul (KR); Jaehee Kwak, Anyang-si (KR); Jeong Pil Kim, Seoul (KR); Hyundong Kim, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 529 days.

(21) Appl. No.: 13/954,072

(22) Filed: Jul. 30, 2013

(65) Prior Publication Data

US 2013/0315302 A1    Nov. 28, 2013

Related U.S. Application Data

(63) Continuation of application No. PCT/KR2012/005075, filed on Jun. 27, 2012.

(30) Foreign Application Priority Data

Jun. 30, 2011    (KR) ........................ 10-2011-0064541

(51) Int. Cl.
*H04N 7/26* (2006.01)
*H04N 19/109* (2014.01)
*H04N 19/176* (2014.01)
*H04N 19/134* (2014.01)
*H04N 19/61* (2014.01)
*H04N 19/12* (2014.01)

(52) U.S. Cl.
CPC ........ *H04N 19/00036* (2013.01); *H04N 19/12* (2014.11); *H04N 19/134* (2014.11); *H04N 19/176* (2014.11); *H04N 19/61* (2014.11)

(58) Field of Classification Search
CPC ................................................ H04N 19/00036
USPC ..................................................... 375/240.03
See application file for complete search history.

(56) References Cited

U.S. PATENT DOCUMENTS

2011/0176607 A1* 7/2011 Kim ..................... H04N 19/593
375/240.08
2013/0177079 A1* 7/2013 Kim ................. H04N 19/00569
375/240.12

FOREIGN PATENT DOCUMENTS

| KR | 1020080026463 | 3/2008 |
| KR | 1020100038060 | 4/2010 |
| KR | 1020110032671 | 3/2011 |

OTHER PUBLICATIONS

International Search Report mailed Dec. 26, 2012 for PCT/KR2012/005075.

*Primary Examiner* — Christopher S Kelley
*Assistant Examiner* — Jonathan Messmore
(74) *Attorney, Agent, or Firm* — Hauptman Ham, LLP (57) ABSTRACT

The present disclosure provides an apparatus for encoding a video including: a prediction unit to generate a predicted block of a current block; a subtraction unit to generate a residual block by subtracting the predicted block from the current block; a transformer to transform the residual block into a frequency transform block by performing different transform methods on different transform units; a quantization unit to quantize the frequency transform block to generate a quantized frequency transform block; and a bitstream generator to encode the quantized frequency transform block into a bitstream.

2 Claims, 7 Drawing Sheets

METHOD AND APPARATUS FOR CODING/DECODING IMAGE

CROSS-REFERENCE TO RELATED APPLICATION

The present application is a continuation of International Patent Application No. PCT/KR2012/005075, filed Jun. 27, 2012, which claims priority to Korean Patent Application No. 10-2011-0064541, filed on Jun. 30, 2011. The disclosures of the above listed application are hereby incorporated by reference herein in their entirety.

FIELD

The present disclosure relates to a method and an apparatus for encoding and/or decoding a video by applying, in consideration of various transform units, different transform methods on a residual block or different inverse transform methods on a frequency transform block.

BACKGROUND

The statements in this section merely provide background information related to the present disclosure and may not constitute prior art.

A new standardization proposal is under progress for High Efficiency Video Coding (HEVC) which is more excellent and outstanding than existing H.264/Advanced Video Coding (AVC) by a joint team of Moving Picture Experts Group (MPEG) and Video Coding Experts Group (VCEG) in the name of Joint Collaborative Team on Video Coding (JCT-VC).

The HEVC standard uses a Coding Tree Block (CTB) as a video encoding unit, and the CTB is defined by various square shapes each of which is mainly called a Coding Unit (CU).

SUMMARY

In accordance with some embodiments of the present disclosure, an apparatus for encoding a video comprises a prediction unit, a subtraction unit, a transformer, a quantization unit and a bitstream generator. The prediction unit is configured to generate a predicted block of a current block. The subtraction unit is configured to generate a residual block by subtracting the predicted block from the current block. The transformer is configured to transform the residual block into a frequency transform block by performing different transform methods on different transform units. The quantization unit is configured to quantize the frequency transform block to generate a quantized frequency transform block. And the bitstream generator is configured to encode the quantized frequency transform block into a bitstream.

In accordance with some embodiments of the present disclosure, an apparatus for decoding a video comprises a bitstream decoder, an inverse quantization unit, an inverse transformer, a prediction unit and an adder. The bitstream decoder is configured to extract a quantized frequency transform block and transform unit information from a bitstream. The inverse quantization unit is configured to reconstruct a frequency transform block by inversely quantizing the quantized frequency transform block. The inverse transformer is configured to reconstruct a residual block by inversely transforming the frequency transform block by performing different inverse transform methods on different transform units according to the extracted transform unit information. The prediction unit is configured to generate a predicted block from a reference block referred to by a motion vector. And the adder is configured to reconstruct a current block by adding the reconstructed residual block and the predicted block.

DETAILED DESCRIPTION

The present disclosure has been made in an effort to improve a compression rate by performing different transform methods on a residual block or different inverse transform methods on a frequency transform block (or frequency coefficient block, hereinafter referred to as "frequency transform block"), in which both the different transform methods and the different inverse transform methods are performed (or determined) in consideration of each size of various transform units.

A video encoding apparatus and/or a video decoding apparatus according to one or more embodiments may correspond to a user terminal such as a PC (personal computer), notebook computer, PDA (personal digital assistant), PMP (portable multimedia player), PSP (PlayStation Portable), wireless communication terminal, smart phone, TV and the like. A video encoding apparatus and/or a video decoding apparatus according to one or more embodiments may correspond to a user terminal or a server terminal such as an application server, service server and the like. A video encoding apparatus and/or a video decoding apparatus according to one or more embodiments may correspond to various apparatuses each including (a) a communication apparatus such as a communication modem and the like for performing communication with various types of devices or wired/wireless communication networks, (b) a memory for storing various programs and data that encode or decode a video or perform an inter/intra-prediction for encoding or decoding, and (c) a microprocessor to execute a program so as to perform calculation and controlling, and the like.

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like. According to one or more embodiments, the bitstream may be decoded in the video decoding apparatus and may be reconstructed to a video, and the video may be played back.

In general, a video may be formed of a series of pictures, and each picture is divided into predetermined regions such as blocks. The divided blocks may be classified into an intra block or an inter block depending on an encoding scheme. The intra-block refers to a block that is encoded based on an intra-prediction coding scheme. The intra-prediction coding scheme predicts pixels in a current block by using pixels in reconstructed blocks that were encoded and decoded in a current picture to which encoding is to be performed, so as to generate a predicted block, and encodes pixel differences between the predicted block and the current block. The inter-block means a block that is encoded based on an inter-prediction coding scheme. The inter-prediction encoding scheme predicts a current block in a current picture referring to at least one previous picture and/or at least one subsequent picture, so as to generate a predicted block, and encodes differences between the predicted block and the current block. Here, a frame that is referred to in encoding or decoding the current picture is called a reference frame. The entropy coding indicates a lossless data compression scheme that is independent of the specific characteristics of the medium.

Figure 1:
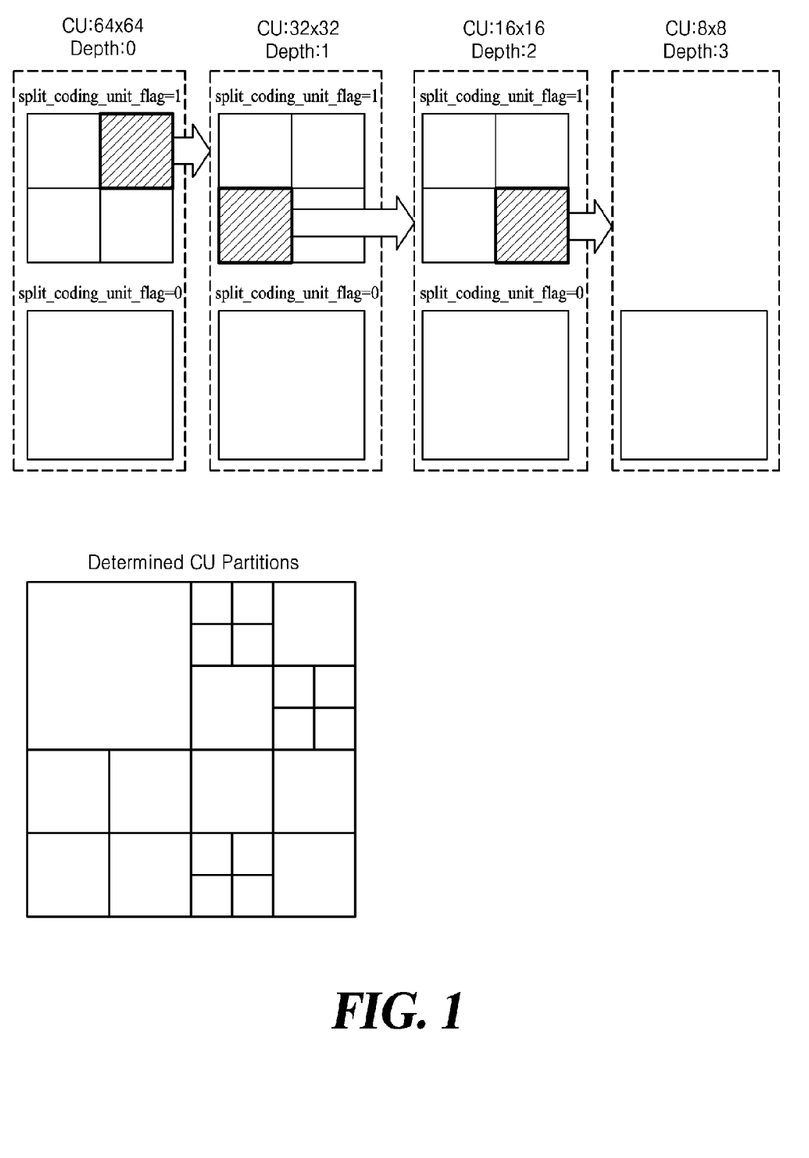
FIG. 1 is a diagram of coding unit (CU) sizes and a quad tree formation.

FIG. 1 is an example of CU sizes and shapes.

Referring to FIG. 1, the CUs are organized in a quad tree where the largest CU of size 64×64 has a depth of "0". In search of optimal CUs, the encoding is recursively performed through the CUs down to depth "3" that is, the CU of size 8×8.

A basic prediction unit is defined as a Prediction Unit (PU), and one CU is divided into a plurality of blocks and then used for the prediction.

Figure 2:
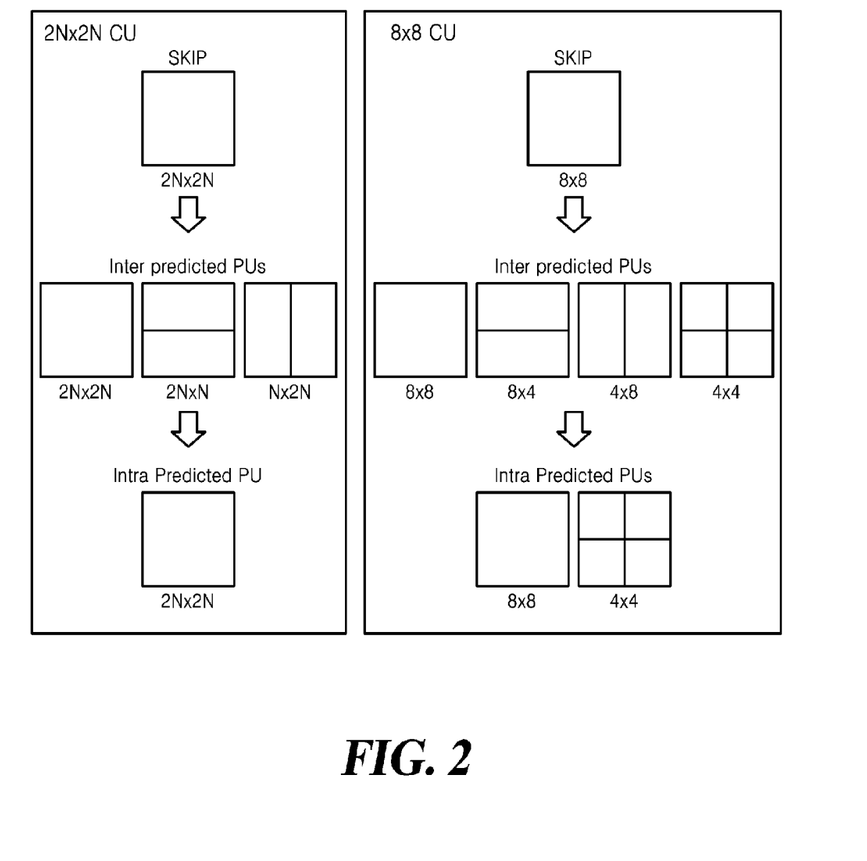
FIG. 2 is a diagram of types of prediction units (PU) coded in a single coding unit (CU) and sequences of coding the PUs.

FIG. 2 is an example of PU types and a sequence of encoding the PUs within one CU.

Referring to FIG. 2, a skip mode is performed in the single CU having a size of 2N×2N followed by sequential predictions in an inter 2N×2N mode, inter 2N×N mode, inter N×2N mode, inter N×N mode, intra 2N×2N mode, and then intra N×N mode. However, in all CUs except for the CU of size 8×8(2N×2N), the encoding is performed in all PUs except for the inter N×N mode and the intra N×N mode.

The inventor(s) has noted that in HEVC, a motion estimation used for an inter-prediction is performed in a prediction unit. The motion estimation is performed to remove temporal redundancy in a video encoding so as to reduce a bitrate. Particularly, the HEVC standard uses inductive processes in the CU and various sizes of PUs, and thus uses various sizes of motion estimations, thereby acquiring a high encoding efficiency.

The prediction of a motion vector is performed with reference to a past image or both of the past image and a future image based on a time axis. Referenced images to encode or decode a current frame are called reference images or reference frames. Supporting multiple reference frames, HEVC can adopt blocks in frames with the greatest redundancy between the current block as reference frames to obtain a higher coding efficiency than by using just one previous frame as a reference frame. Further, HEVC further improves the encoding efficiency by using a rate-distortion optimization technology to select an optimal mode from all available encoding modes in a CU such as the skip mode, inter 2N×2N mode, inter 2N×N mode, inter N×2N mode, inter N×N mode, intra 2N×2N mode, and intra N×N mode.

According to the HEVC standard provided to encode/decode video data, the inventor(s) has noted that transformation is applied for various sizes of transformation units to reduce spatial correlation of residual signals within a residual block after an inter/intra prediction and improve a compression rate of energy, and quantization is used to improve a compression rate of frequency coefficients. The inventor(s) has, however, experienced that a constant transformation method used regardless of transformation sizes deteriorates a compression rate of a video.

Figure 3:
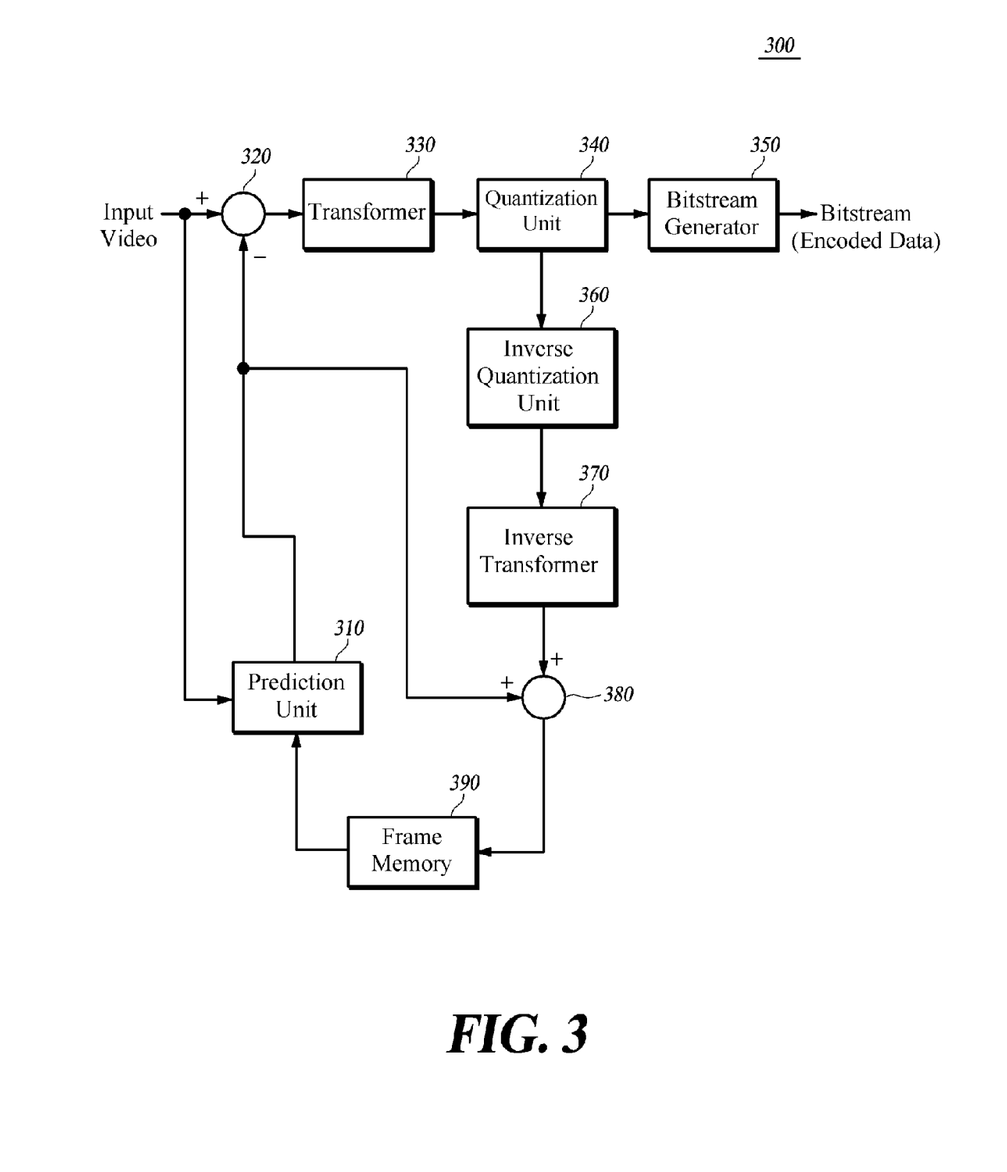
FIG. 3 is a schematic block diagram of a video encoding apparatus according to at least one embodiment of the present disclosure.

FIG. 3 is a schematic block diagram ally of a video encoding apparatus according to at least one embodiment of the present disclosure.

A video encoding apparatus 300 according to at least one embodiment of the present disclosure is configured to encode a video by generating a predicted block from a current block of a video through a prediction unit or predictor 310 and generating a residual block between the current block and the predicted block, and performing transform and quantization on the residual block. The video encoding apparatus 300 comprises the prediction unit 310, a subtraction unit 320, a transform unit (or transformer) 330, a quantization unit 340, a bitstream generator 350, an inverse quantization unit 360, an inverse transformer 370, an adder 380, and a frame memory 390 as illustrated in FIG. 3. Other components of the video encoding apparatus 300, such as the prediction unit 310, the subtraction unit 320, the transformer 330, the quantization unit 340, the bitstream generator 350, the inverse quantization unit 360, the inverse transformer 370, and the adder 380 are implemented by one or more processors and/or application-specific integrated circuits (ASICs).

A video to be encoded is input in a coding unit (CU), and the CU may take the form of an N×N block where N has a size of $2^n$. The CU may be in a quad tree formation, and the encoding is recursively performed from a largest coding unit to a designated depth.

The prediction is performed in the prediction unit (PU) within one CU. In the video encoding apparatus, the PU is in an N×M block form, and N and M have size of $2^n$ and $2^m$ (n>0 and M>0), respectively. Types of the prediction within one CU include four inter PUs and two intra PUs as illustrated in FIG. 2. The coding is performed for all the PUs and information on a PU having the highest compression efficiency is transmitted to the video decoding apparatus. The compression efficiency criteria may be a rate distortion cost including the number of bits required for transmitting video information and a difference value between an original block and a predicted block.

In order to predict a PU in a current CU, the prediction unit 310 generates a predicted block by using another frame or by using already encoded pixel values (for example, pixel values in a left side, a lower left side, an upper side, and an upper right side). In other words, while the prediction unit 310 in the intra prediction mode generates the predicted block by determining and using a prediction mode with previously encoded and reconstructed CU information of the left side, lower left side, upper side and upper right side, the prediction unit 310 generates the same in the inter prediction mode by generating a motion vector through a motion estimation on a previously encoded and reconstructed frame and by undergoing a motion compensation process using the generated motion vector.

The subtraction unit 320 generates a residual signal by calculating the difference between an original pixel value of each pixel of the current block and a predicted value thereof generated by the prediction unit 310.

The transformer 330 transforms the residual signal generated by the subtraction unit 320 into a frequency domain.

The transformer 330 performs the transform in TU (Transform Unit). The TU is in an N×N block form and N has a size of $2^n$. The transform is sequentially performed for each TU by the transformer 330 just after the prediction is performed for the current PU, and the size of the TU is identical to or smaller than the size of the corresponding CU and irrelevant to the size of the corresponding PU. The TU has a quad tree form similar to that of the CU and recursively performs the transform from the size of the CU to a variably designated depth. At this time, a split transform flag for each depth of the TU is transmitted to the video decoding apparatus as information on a size of the TU having the lowest RD cost.

Here, the transformer 330 can transform the residual signal into a frequency domain by using Discrete Cosine Transform (DCT) which transforms pixel signals on a time axis into pixel signals on a frequency axis. That is, the transformer 330 transforms the residual signal (or residual block) into a frequency domain to thereby generate a "frequency transform block". Here, so-called "frequency transform block" includes one or more frequency coefficients resulted from the residual signal in the residual block.

Particularly, according to at least one embodiment of the present disclosure, when the prediction is performed in the inter-prediction mode by the prediction unit 310 and the TU is of the minimum size such as 4×4 among the available sizes, a correlation coefficient derived through Equation (1) or (2) below is very likely to have a value ranging from −0.5 to 0.5. Accordingly, an encoding performance can be improved using Discrete Sine Transform (DST) having a higher compression capability in comparison with DCT. When the TU is of a larger available size than the minimum size, DCT can be used.

$$\rho_{B^C,B^S} = \frac{\sum_{x=0}^{3}\sum_{y=0}^{3}(B_{x,y}^C - B'^C)(B_{x,y}^{LS} - B'^{LS})}{\sqrt{\sum_{x=0}^{3}\sum_{y=0}^{3}(B_{x,y}^C - B'^C)^2}\sqrt{\sum_{x=0}^{3}\sum_{y=0}^{3}(B_{x,y}^{LS} - B'^{LS})^2}} \quad \text{Equation (1)}$$

$$\rho_{B^C,B^S} = \frac{\sum_{x=0}^{3}\sum_{y=0}^{3}(B_{x,y}^C - B'^C)(B_{x,y}^{RS} - B'^{RS})}{\sqrt{\sum_{x=0}^{3}\sum_{y=0}^{3}(B_{x,y}^C - B'^C)^2}\sqrt{\sum_{x=0}^{3}\sum_{y=0}^{3}(B_{x,y}^{RS} - B'^{RS})^2}} \quad \text{Equation (2)}$$

In Equations (1) and (2), $B^c$ denotes a current block having size 4×4, and $B^s$ denotes a block generated by moving the current block by one pixel in a horizontal direction (right or left direction). $B^c_{x,y}$ denotes a value of (x,y) position within the current 4×4 block, $B^{LS}_{x,y}$ and $B^{RS}_{x,y}$ denote a value of (x,y) position within a 4×4 block generated by moving the current 4×4 block by one pixel in right and left directions, respectively, and $B'^C$, $B'^{LS}$, and $B'^{RS}$ denote average values of pixels within the 4×4 blocks corresponding to $B^c_{x,y}$, $B^{LS}_{x,y}$, and $B^{RS}_{x,y}$, respectively. When the current TU having size 4×4 is one located in a rightmost side within the CU, Equation (1) is used. Otherwise, Equation (2) is used to calculate a correlation coefficient.

The quantization unit 340 quantizes a frequency transform block (Here, "frequency transform block" can also be defined as "frequency transformed residual block" or "frequency coefficient block") including the residual signal transformed into the frequency domain by the transformer 330. That is, the quantization unit 340 quantizes a frequency transform block to generate a quantized frequency transform block. At this time, for TUs of a luminance signal and a chrominance signal having all-zero quantized transform coefficients, a Coded Block Flag (CBF) indicating that the coefficients are all "0" is transmitted. The quantization is performed by using various quantization schemes such as Dead Zone Uniform Threshold Quantization (DZUTQ), quantization weighted matrix and the like.

The bitstream generator 350 encodes a quantized frequency transform block (i.e., a "quantized frequency transform block" indicates a frequency transform block having the frequency coefficients quantized by the quantization unit 340, the "quantized frequency transform block" includes one or more quantized frequency coefficients) into a bitstream. Particularly, at least one embodiment of the present disclosure utilizes DST when the prediction is performed in the inter-prediction mode and the TU has a minimum available TU size such as 4×4 and utilizes DCT for TUs of sizes 8×8, 16×16, 32×32, etc except the minimum available TU size such as 4×4. That is, the transformer 330 transforms the residual block to the frequency transform block by using a DST-based transform scheme with applying a transform unit having a minimum size among sizes of the various transform units. Further, the transformer 330 transforms the residual block to the frequency transform block by using a DCT-based transform scheme with respect to other transform units except for the transform unit having a minimum size among sizes of the various transform units. This leads to an improvement of the video compression rate without transmission of any information representing the type of transform. An entropy encoding technology may be used for the above encoding into the bitstream, but the present disclosure is not limited thereto and may use other various encoding technologies.

Further, the bitstream generator 350 can insert into encoded data various pieces of information required for decoding the encoded bitstream as well as the bitstream which the quantized frequency coefficients in the quantized frequency transform block are encoded into. Here, the quantized frequency coefficients are parts of the quantized frequency transform block. In other words, the encoded data may include a field containing a Coded Block pattern (CBP), a delta quantization parameter, and the bitstream from encoding the quantized frequency coefficients and a field containing bits for information required for the prediction (for example, an intra-prediction mode in the intra-prediction or a motion vector in the inter-prediction).

The inverse quantization unit 360 reconstructs a frequency transform block by inversely quantizing the quantized and transformed residual block (that is, quantized frequency transform block) to thereby reconstruct (or generate) a frequency transform block, and the inverse transformer 370 reconstructs the residual block by inversely transforming the reconstructed frequency transform block. Here, the inverse quantization and the inverse transform may be achieved by inversely performing the transform process by the transformer 330 and the quantization process by the quantization unit 340, respectively. Particularly, at least one embodiment of the present disclosure utilizes inverse DST when the prediction is performed in the inter-prediction mode and the TU has a minimum available TU size such as 4×4 and utilizes inverse DCT for TUs of relatively larger sizes 8×8, 16×16, 32×32, etc except the minimum available TU size such as 4×4. That is, the transformer 330 transforms the residual block to the frequency transform block by using a DST-based transform scheme with applying a transform unit having a minimum size among sizes of the various transform units. Further, the transformer 330 transforms the residual block to the frequency transform block by using a DCT-based transform scheme with respect to other transform units except for the transform unit having a minimum size among sizes of the various transform units. In other words, the inverse quantization unit 360 and the inverse transformer 370 can perform the inverse quantization and the inverse transform by using information on the transform and the quantization (for example, information on types of transform and quantization) generated and transmitted from the transformer 330 and the quantization unit 340.

The adder 380 generates a reconstructed block by adding the predicted block generated by the prediction unit 310 and the residual block reconstructed by the inverse quantization unit 370.

The frame memory 390 stores the reconstructed block generated by the adder 380, and the reconstructed block is used as a reference block to generate a predicted block in the intra or inter-prediction.

Meanwhile, the DST is calculated through Equation (3) by the transformer 330.

$$Y(k) = \sqrt{\frac{2}{N+1}} \sum_{n=0}^{N-1} X(n)\sin\frac{\pi(k+1)(n+1)}{N+1}, 0 \le k \le N-1 \quad \text{Equation (3)}$$

In Equation (3), X denotes a target video to be discrete sine transformed, and Y denotes a second video coefficient which is discrete sine transformed. Further, N denotes a size of the DST.

Figure 4:
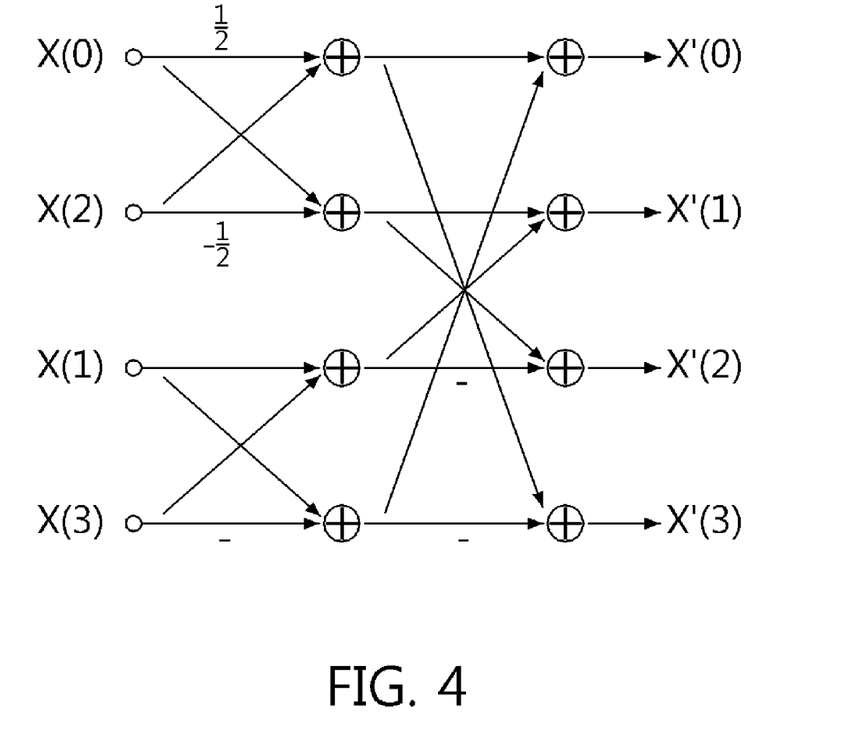
FIG. 4 is a diagram of the concept of an integer sine inverse transform according to at least one embodiment of the present disclosure.

FIG. 4 is a diagram of the concept of the DST according to at least one embodiment of the present disclosure.

When the target video has a size of 4×4, the DST in Equation (3) may be simply performed according to at least one embodiment illustrated in FIG. 4.

Figure 5:
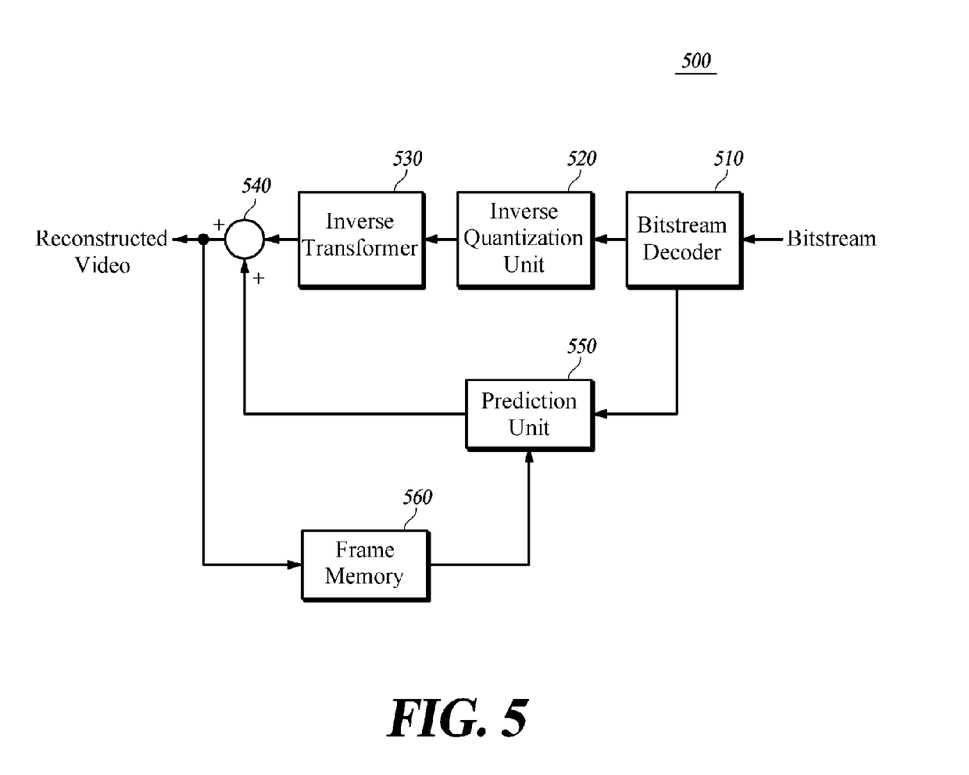
FIG. 5 is a schematic block diagram of a video decoding apparatus according to at least one embodiment of the present disclosure.

FIG. 5 is a block diagram of the video decoding apparatus according to at least one embodiment of the present disclosure.

As illustrated in FIG. 5, a video decoding apparatus 500 according to at least one embodiment of the present disclosure comprises a bitstream decoder 510, an inverse quantization unit 520, an inverse transform unit 530, an adder 540, a prediction unit 550 and a frame memory 560. Other components of the video decoding apparatus 500, such as the bitstream decoder 510, the inverse quantization unit 520, the inverse transformer 530, the adder 540, and the prediction unit 550 are implemented by one or more processors and/or application-specific integrated circuits (ASICs).

The bitstream decoder 510 decodes a bitstream to thereby generate (or reconstruct) a quantized frequency transform block.

The bitstream decoder 510 can decode or extract pieces of information required for some decoding procedures and/or generating the quantized frequency transform block by decoding encoded data. The pieces of information required for the decoding refer to information items required for decoding the encoded bitstream within the encoded data (that is, the bitstream) and include at least one selected from the group consisting of, for example, information on a block type, information on a motion vector, information on types of transform and quantization such as transform unit information, and various other information.

In other words, the bitstream decoder 510 extracts transform unit information from a bitstream. The bitstream decoder 510 also extracts the quantized frequency transform block containing pixel information of the current block of the video by decoding the bitstream that is the encoded data from the video encoding apparatus 500, and transmits required information for predicting the extracted block to the prediction unit 550.

The prediction unit 550 can predict the current block in the same way as that of the prediction unit 310 of the video encoding apparatus 300 by using the required information for predicting, which is transmitted from the bitstream decoder 510.

The prediction unit 550 generates a predicted block by using a reference block referred to by the motion vector of the current block.

The inverse quantization unit 520 inversely quantizes the quantized frequency transform block extracted from the bitstream by the bitstream decoder 510 to thereby reconstruct (or generate) a frequency transform block.

As with the inverse transformer 370 of the video encoding apparatus 300, the inverse transformer 530 of the video decoding apparatus 500 according to at least one embodiment of the present disclosure utilizes inverse DST to inversely transform the inversely quantized frequency transform block (i.e., the frequency transform block reconstructed by the inverse quantization unit 520) into a pixel domain when the prediction is performed in the inter-prediction mode and the TU has the minimum available TU size of 4×4, and utilizes inverse DCT for other remaining frequency transform blocks to inversely transform the frequency transform block into the pixel domain to thereby reconstruct (or generate) a residual signal (or residual block). The inverse transformer 530 inversely transforms the frequency transform block by using an inverse Discrete Sine Transform (DST) scheme when information identified from the extracted transform unit indicates a transform unit having a minimum size among sizes of various transform units available. Further, the inverse transformer 530 inversely transforms the frequency transform block by using an inverse Discrete Cosine Transform (DCT) scheme with respect to other transform units except for a transform unit having a minimum size among sizes of the various transform units.

The adder 540 reconstructs the current block as well as an original pixel value of the current block by adding the residual signal reconstructed through the inverse transform by the inverse transformer 530 and the predicted pixel value generated by the prediction unit 550. In result, the adder 540 reconstructs a video by reconstructing the current block.

The current block reconstructed by the adder 540 or the prediction unit 550 is transmitted to the frame memory 560 and then used for predicting another block by the prediction unit 550.

The frame memory 560 stores the reconstructed video and allows the inter prediction block and intra prediction block to be generated.

The video encoding/decoding apparatus according to at least one embodiment of the present disclosure may be implemented by connecting a bitstream output terminal of the video encoding apparatus 300 of FIG. 3 with a bitstream input terminal of the video decoding apparatus 500 of FIG. 4.

The video encoding/decoding apparatus according to at least one embodiment of the present disclosure includes a video encoder which generates a predicted block of a current block, generates a frequency transform block by transforming a residual block generated by subtracting the predicted block from the current block with distinctive transform methods used by each size of transform units, quantizes the generated frequency transform block, and encodes the quantized frequency transform block into a bitstream. The video encoding/decoding apparatus further includes a video decoder which extracts information on the quantized frequency transform block and the transform unit from the bitstream, reconstructs the frequency transform block by inversely quantizing the quantized frequency transform block, reconstructs a residual block by inversely transforming the frequency transform block with different inverse transform methods by the extracted transform unit, generates a predicted block from a reference block referred to by a motion vector, and reconstructs the current block by adding the reconstructed residual block and the predicted block.

Here, the video encoder can be implemented by the video encoding apparatus 300 according to at least one embodiment of the present disclosure, and the video decoder can be implemented by the video decoding apparatus 500 according to at least one embodiment of the present disclosure.

Figure 6:
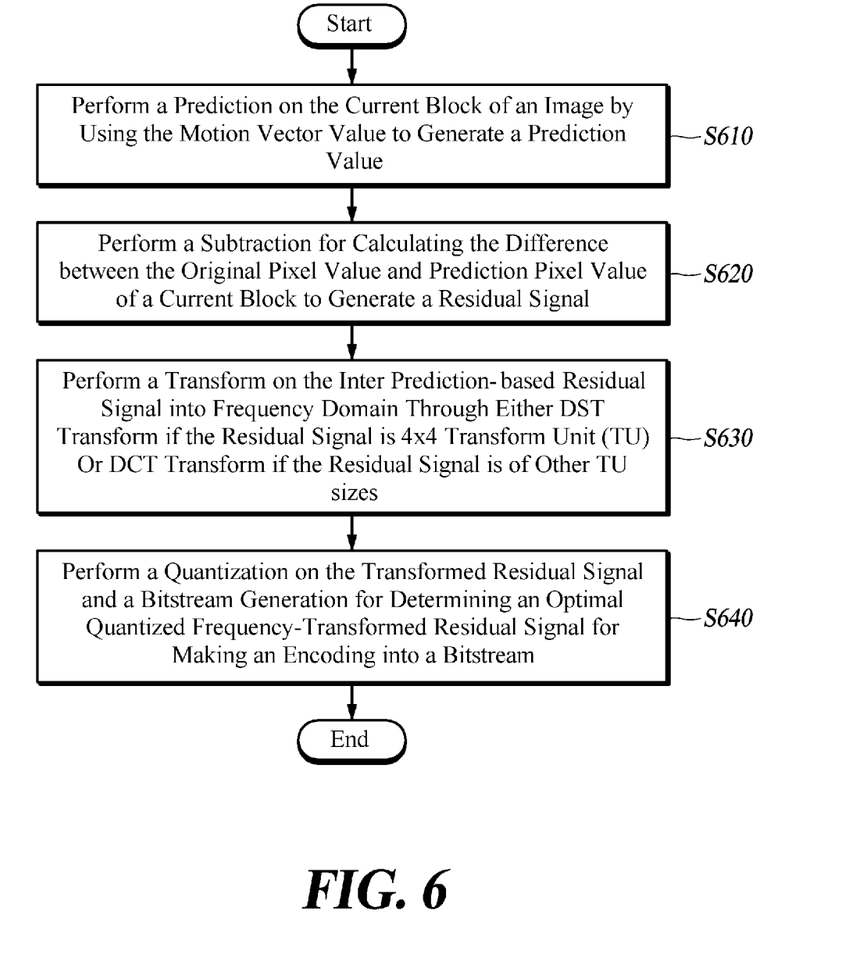
FIG. 6 is a flowchart of a video encoding method according to at least one embodiment of the present disclosure.

FIG. 6 is a flowchart of a video encoding method according to at least one embodiment of the present disclosure.

In particular, the video encoding apparatus 300 encodes a video through a prediction step S610 of generating a predicted value by using a motion vector value of a current block of a video, a subtraction step S620 of generating a residual signal by calculating difference values between original pixel values of the current block and predicted pixel values, a transform step S630 of transforming the residual signal into a frequency domain by using DST when the residual signal generated through the inter prediction corresponds to the TU having a size of 4×4 and by using DCT when the residual signal corresponds to other sizes of TUs, a quantization step S640 of quantizing the transformed residual signal, and a bitstream generation step S650 of encoding the quantized frequency-transformed residual signal into a bitstream.

Here, since the prediction step S610 corresponds to the prediction unit 310 in functionality, the transform step S630 to the transformer 330, the quantization step S640 to quantization unit 340, and the bitstream generation step S650 to bitstream generator 350, respectively, detailed descriptions thereof will be omitted.

Figure 7:
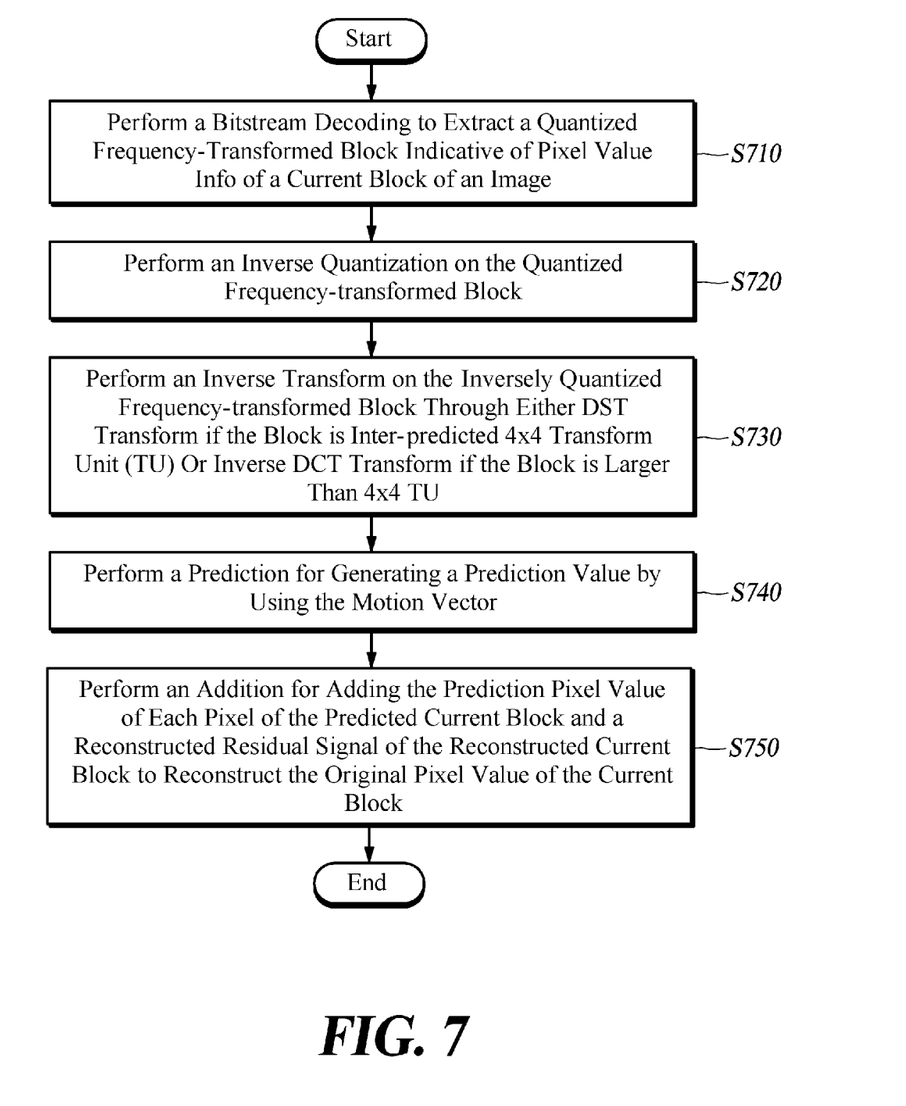
FIG. 7 is a flowchart of a video decoding method according to at least one embodiment of the present disclosure.

FIG. 7 is a flowchart of a video decoding method according to at least one embodiment of the present disclosure.

Storing a bitstream of the video upon receipt through a wired/wireless communication network, a cable or the like, the video decoding apparatus 500 can reconstruct the video following a user selection or by a certain programmed algorithm running thereon through generating a prediction value by using a motion vector value of the current block and through adding the generated prediction value and an inversely quantized and inversely transformed residual signal generated only when a quantized frequency transform coefficient exists.

To this end, the video decoding apparatus 500 decodes the transmitted bitstream through a bitstream decoding step S710 of decoding the bitstream to extract a quantized frequency transform block indicating information on pixel values of a current block of a video, an inverse quantization step S720 of inversely quantizing the quantized frequency transform block, an inverse transform step S730 of inversely transforming the inversely quantized frequency transform block into a pixel domain by using inverse DST when the inversely quantized frequency transform block is the 4×4 TU predicted by the inter prediction and by using inverse DCT when the inversely quantized frequency transform block is larger than the 4×4 TU, a prediction step S740 of generating a predicted value by using a motion vector value, and an addition step S750 of reconstructing original pixel values of the current block by adding the residual signal of the current block reconstructed in step S730 and the predicted pixel value of each pixel of the current block predicted in step S740. When there is no quantized frequency transform residual signal, the prediction step S740 results in the current block.

Here, since the bitstream decoding step S710 corresponds to the bitstream decoder 510 in functionality, the inverse quantization step S720 to inverse quantization unit 520, the inverse transform step S730 to inverse transformer 530, the prediction step S740 to prediction unit 550, and the addition step S750 to adder 540, detailed descriptions thereof will be omitted.

The video encoding/decoding method according to at least one embodiment of the present disclosure may be implemented by combining the video encoding method according to at least one embodiment of the present disclosure and the video decoding method according to at least one embodiment of the present disclosure.

The video encoding/decoding method according to at least one embodiment of the present disclosure includes encoding a video comprising generating a predicted block of a current block, transforming a residual block generated by subtracting the predicted block from the current block to generate a frequency transform block with different transform methods used by different transform units, quantizing the generated frequency transform block, and encoding the quantized frequency transform block into a bitstream. And the video encoding/decoding method further includes decoding a video comprising extracting the quantized frequency transform block and information on the transform unit from the bitstream, inversely quantizing the quantized frequency transform block to reconstruct the frequency transform block, inversely transforming the frequency transform block to reconstruct a residual block with different inverse transform methods used by the extracted transform unit, generating a predicted block from a reference block referred to by a motion vector, and adding the reconstructed residual block and the predicted block to reconstruct the current block.

Here, the step of encoding the video may be implemented by the video encoding step according to at least one embodiment of the present disclosure and the step of decoding the video may be implemented by the video decoding step according to at least one embodiment of the present disclosure.

In the description above, although all of the components of the embodiments of the present disclosure may have been explained as assembled or operatively connected as a unit, one who has an ordinary skill in the art would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art. The computer program is stored in a non-transitory computer readable media, which in operation realizes the embodiments of the present disclosure. The computer readable media includes magnetic recording media, or optical recording media, in some embodiments.

According to the present disclosure as described above, there is an effect of improving a compression rate by performing different transform methods on a residual block or different inverse transform methods on a frequency transform block, based on a size of transform units. Particularly, the present video encoding/decoding method and apparatus can use DST (Discrete Sine Transform) when a transform unit is of a minimum size such as 4×4, and use DCT (Discrete Cosine Transform) when the transform unit is larger than the minimum unit size to maximize, in an encoding operation, the video compression rate and then similarly perform an inverse transform to decode a bitstream. As described above, the present disclosure is highly useful for obtaining an effect of improving a compression rate by transforming a residual block or inversely transforming a frequency transform block through a different transform method or a different inverse transform method according to a transform unit.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. An apparatus for encoding a video, the apparatus comprising:
    a bitstream decoder configured to extract information on a size of a transform unit and generate a quantized frequency transform block from a bitstream;
    an inverse quantization unit configured to reconstruct a frequency transform block by inversely quantizing the quantized frequency transform block;
    an inverse transformer configured to reconstruct a residual block by inversely transforming the frequency transform block, the inverse transformer selecting an inverse transform scheme among a plurality of inverse transform schemes in consideration of the size of the transform unit;
    a predictor configured to generate a predicted block in a prediction mode selected among an intra prediction mode and an inter prediction mode; and
    an adder configured to reconstruct a current block by adding a first pixel corresponding to the residual block and a second pixel corresponding to the predicted block,
    wherein the inverse transformer considers a first transform scheme only when the size of the transform unit corresponds to a transform unit size of 4×4 among a plurality of available transform unit sizes,
    wherein the transform unit is divided from a coding unit in a quad tree, and the bitstream decoder decodes a split transform flag, as one of the information on the size of the transform unit, for at least one depth of the quad tree,
    wherein the first transform scheme corresponds to a transform scheme in which each of four output values $\{X'(0), X'(1), X'(2), X'(3)\}$ is generated by using at least two of four input values $\{X(0), X(1), X(2), X(3)\}$ multiplied by coefficients corresponding to each of the input values,
    wherein the transform scheme in which each of four output values $\{X'(0), X'(1), X'(2), X'(3)\}$ is generated corresponds to a transform in which,
        a first group of the coefficients used for generating the first output value X'(0) includes a coefficient for the X(0), a coefficient for the X(1) and a coefficient for the X(2), all having positive signs,
        a second group of the coefficients used for generating the second output value X'(1) includes a coefficient for the X(0) and a coefficient for the X(1), both having positive signs,
        a third group of the coefficients used for generating the third output value X'(2) includes a coefficient for the X(1) and a coefficient for the X(2), both having negative signs, and
        a fourth group of the coefficients used for generating the fourth output value X'(3) included a coefficient for the X(1), having a negative sign, and a coefficient for the X(2), having a positive sign.

2. The apparatus of claim 1, wherein the inverse transformer selects the inverse transform scheme in consideration of the prediction mode corresponding to the predicted block together with the size of the transform unit.

* * * * *